US 8,406,496 B2

(12) United States Patent
Zheng et al.

(10) Patent No.: US 8,406,496 B2
(45) Date of Patent: Mar. 26, 2013

(54) METHOD AND SYSTEM FOR LEFT VENTRICLE DETECTION IN 2D MAGNETIC RESONANCE IMAGES

(75) Inventors: Yefeng Zheng, Dayton, NJ (US); Xiaoguang Lu, Plainsboro, NJ (US); Bogdan Georgescu, Plainsboro, NJ (US); Edgar Müller, Heroldsbach (DE); Dorin Comaniciu, Princeton Junction, NJ (US); Arne Littmann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 905 days.

(21) Appl. No.: 12/504,047

(22) Filed: Jul. 16, 2009

(65) Prior Publication Data
US 2010/0040272 A1    Feb. 18, 2010

Related U.S. Application Data

(60) Provisional application No. 61/084,277, filed on Jul. 29, 2008.

(51) Int. Cl.
*G06K 9/00* (2006.01)
(52) U.S. Cl. ........................................................ 382/131
(58) Field of Classification Search ........... 382/128–132
See application file for complete search history.

(56) References Cited

U.S. PATENT DOCUMENTS

| | | | |
|---|---|---|---|
| 5,617,459 A * | 4/1997 | Makram-Ebeid et al. ...... | 378/62 |
| 5,889,524 A * | 3/1999 | Sheehan et al. ............... | 345/419 |
| 6,961,454 B2 | 11/2005 | Jolly | |
| 2003/0038802 A1 * | 2/2003 | Johnson et al. ............... | 345/420 |
| 2005/0018890 A1 * | 1/2005 | McDonald et al. ........... | 382/128 |
| 2006/0239554 A1 * | 10/2006 | Sun et al. ...................... | 382/173 |
| 2007/0236491 A1 * | 10/2007 | Hundley et al. ............... | 345/418 |
| 2007/0270692 A1 * | 11/2007 | Barbu et al. ................... | 600/431 |
| 2008/0085050 A1 | 4/2008 | Barbu et al. | |
| 2008/0101676 A1 | 5/2008 | Zheng et al. | |
| 2008/0211812 A1 | 9/2008 | Barbu et al. | |
| 2008/0260230 A1 * | 10/2008 | Gotardo et al. ............... | 382/131 |
| 2008/0292169 A1 * | 11/2008 | Wang et al. ................... | 382/131 |
| 2009/0080745 A1 | 3/2009 | Zheng et al. | |
| 2009/0214090 A1 * | 8/2009 | Hayes ............................ | 382/128 |
| 2009/0281415 A1 * | 11/2009 | Cupps et al. .................. | 600/410 |
| 2009/0290777 A1 * | 11/2009 | Sun et al. ...................... | 382/131 |

* cited by examiner

*Primary Examiner* — Jingge Wu

(57) ABSTRACT

A method and system for left ventricle (LV) detection in 2D magnetic resonance imaging (MRI) images is disclosed. In order to detect the LV in a 2D MRI image, a plurality of LV candidates are detected, for example using marginal space learning (MSL) based detection. Candidates for distinctive anatomic landmarks associated with the LV are then detected in the 2D MRI image. In particular, apex candidates and base candidates are detected in the 2D MRI image. One of the LV candidates is selected as a final LV detection result using component-based voting based on the detected LV candidates, apex candidates, and base candidates.

21 Claims, 8 Drawing Sheets

FIG. 4B

INPUT: Detected candidates for the LV whole body $(C_{lv}^1, \ldots, C_{lv}^M)$, apex $(C_{apex}^1, \ldots, C_{apex}^N)$, and base $(C_{base}^1, \ldots, C_{base}^K)$.
OUTPUT: The best candidate, $C_{lv}^{best}$, for the LV whole body.

Initialize the votes for all LV candidates $V_{lv}^1, \ldots, V_{lv}^M$ to zero.
For $i = 1, 2, \ldots, M$ 452 {
    /* Voting from LV candidates */
    For $j = 1, 2, \ldots, M$
        If the box-box distance between $C_{lv}^i$ and $C_{lv}^j$ is less than $D_{LV}^{max} = 20mm$
            $V_{lv}^i = V_{lv}^i + 1$
        End
    End 454 {
    /* Voting from apex candidates */
    Calculate the predicted position of the apex, $P_{apex}$, based on $C_{lv}^i$.
    For $j = 1, 2, \ldots, N$
        If the center-center distance between $P_{apex}$ and $C_{apex}^j$ is less than $D_{apex}^{max} = 10mm$
            $V_{lv}^i = V_{lv}^i + 1$
        End
    End 456 {
    /* Voting from base candidates */
    Calculate the predicted position of the base, $P_{base}$, based on $C_{lv}^i$.
    For $j = 1, 2, \ldots, K$
        If the center-center distance between $P_{base}$ and $C_{base}^j$ is less than $D_{base}^{max} = 10mm$
            $V_{lv}^i = V_{lv}^i + 1$
        End
    End
End 458 → Return the LV candidate with the largest number of votes.

METHOD AND SYSTEM FOR LEFT VENTRICLE DETECTION IN 2D MAGNETIC RESONANCE IMAGES

This application claims the benefit of U.S. Provisional Application No. 61/084,277, filed Jul. 29, 2008, the disclosure of which is herein incorporated by reference.

BACKGROUND OF THE INVENTION

The present invention relates to medical imaging of the heart, and more particularly, to automatic detection of the left ventricle in 2D magnetic resonance images.

Cardiovascular disease is the leading cause of death in developed countries. Early diagnosis can be effective in reducing the mortality of cardiovascular disease. Magnetic resonance imaging (MRI) can accurately depict cardiac structure, function, perfusion, and myocardial viability with a capacity unmatched by any other imaging modality. Accordingly, MRI is widely accepted as the gold standard for heart chamber quantification, which means that measurements extracted using other imaging modalities, such as echocardiography and computed tomography (CT), typically must be verified using MRI. Quantification of the left ventricle (LV) is of particular interest among the four heart chambers because it pumps oxygenated blood from the heart to the rest of the body. In order to quantify functional measurements of the LV, it is necessary to detect or segment the LV in an MRI image.

Automatic LV detection in MRI images is a challenging problem due to large variations in orientation, size, shape, and image intensity of the LV. First, unlike CT, MRI is flexible in selecting the orientation of the imaging plane, and this helps cardiologists to capture the best view for diagnosis. However, this flexibility presents a large challenge for automatic LV detection because both the position and orientation of the LV are unconstrained in an image. The LV is a roughly rotation symmetric object around its long axis, which is generally defined as the axis connecting the LV apex to the center of the mitral valve. Long-axis views (where the imaging plane passes through the LV long axis) are often captured to perform LV measurement. However, the orientation of the LV long axis in the image is unconstrained. Second, an MRI image only captures a 2D intersection of a 3D object, therefore information is lost compared to a 3D volume. The image plane can be rotated to get several standard cardiac views, such as the apical-two-chamber (IC) view, the apical-three-chamber (A3C), the apical-four-chamber (A4C), and the apical-five-chamber (A5C) view. However, this view information is not available to help automatic LV detection. Although the LV and right ventricle (RV) have quite different 3D shapes, in the 2D A4C view, the LV is likely to be confused with the RV. Third, the LV shape changes significantly in a cardiac cycle. The heart is a non-rigid shape, which changes shape as it beats to pump blood to the body. In order to study the dynamics of the heart, a cardiologist needs to capture images from different cardiac phases. The LV shape changes significantly from the end-diastolic (ED) phase (when the LV is the largest) to the end-systolic (ES) phase (when the LV is the smallest). Finally, the pixel intensity of an MRI image does not have a standard physical meaning. MRI images captured with different scanners or different imaging protocols may have large variations in intensity. Accordingly, an automatic LV detection method which overcomes the above challenges is desirable.

BRIEF SUMMARY OF THE INVENTION

The present invention provides a method and system for automatic left ventricle (LV) detection in 2D MRI images. Embodiments of the present invention separately detect LV candidates, using marginal space learning (MSL), and anatomic landmark candidates related to the LV. Component-based voting is then used to combine the LV candidates and anatomic landmark candidates to detect the LV in a 2D MRI image.

In one embodiment of the present invention, a plurality of LV candidates are detected, for example using MSL. Apex candidates and base candidates are then detected in the 2D MRI image. One of the LV candidates is selected as a final LV detection result using component-based voting based on the detected LV candidates, apex candidates, and base candidates. In the component-based voting, a particular LV candidate receives votes for all other LV candidates within a distance of the particular LV candidate, each apex candidate having a center within a distance of a predicted apex position for the particular LV candidate, and each base candidate having a center within a distance of a predicted basal center position for the particular LV candidate. The LV candidate with the largest number of votes is selected as the final LV detection result.

These and other advantages of the invention will be apparent to those of ordinary skill in the art by reference to the following detailed description and the accompanying drawings.

BRIEF DESCRIPTION OF THE DRAWINGS

FIG. 4B illustrates pseudo-code for implementing the method of FIG. 4A;

DETAILED DESCRIPTION

The present invention is directed to a method and system for automatic left ventricle (LV) detection in 2D magnetic resonance imaging (MRI) images. Embodiments of the present invention are described herein to give a visual understanding of the left ventricle detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
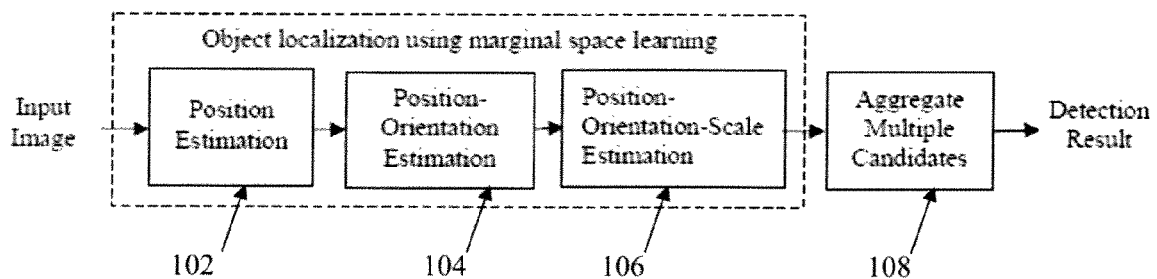
FIG. 1 illustrates object localization using MSL according to an embodiment of the present invention.

Discriminative learning based approaches are efficient and robust for solving many 2D detection problems. In such methods, shape detection and localization is formulated as a classification problem: whether an image block contains the target shape or not. In order to build a robust system, a classifier only tolerates limited variation in object pose. The object is found by scanning the classifier exhaustively over all possible combination of locations, orientations, and scales. This search strategy is different from other parameter estimation approaches, such as deformable models, where an initial estimate is adjusted (e.g., using a gradient descent technique) to optimize a predefined objective function. Exhaustive searching makes the system robust under local minima. However, it is challenging to extend such learning based techniques using exhaustive searching to a high dimensional space because the number of hypotheses increases exponentially with respect to the dimensionality of the parameter space. Recently, marginal space learning (MSL) has been developed to apply learning based techniques for 3D object detection. For example, a method for MSL-based heart chamber segmentation is described in detail in U.S. Patent Application Publication No. 2008/0101676, entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. FIG. 1 illustrates object localization using MSL according to an embodiment of the present invention. As illustrated in FIG. 1, object localization or detection in an input image is split into three steps: object position estimation (step 102), position-orientation estimation (step 104), and position-orientation-scale estimation (step 106). After each step, a few candidates are obtained for the following estimation step. The candidates resulting from the position-orientation-scale estimation step (step 106) are then aggregated at step 108 to generate a detection result. MSL has been successfully applied to many 3D object detection problems in medical imaging.

MSL was originally proposed for 3D object detection. Although MSL can be applied to 2D object detection to detect the LV in a 2D MRI image, this detection problem is challenging due to large variations in orientation, size, shape, and image intensity of the LV. The performance of a single whole-object detector is limited. Accordingly, in addition to the LV whole-object detected using MSL, embodiments of the present invention also detect several LV landmarks, such as the LV apex and two annulus points, and combine the detected candidates from the whole-object detector and landmark detectors in order to improve the robustness of the LV detection. Further, embodiments of the present invention utilize a voting method to combine the holistic and component-based detection results in order to achieve a more robust LV detection result and reduce the effect of detection outliers.

Figure 2:
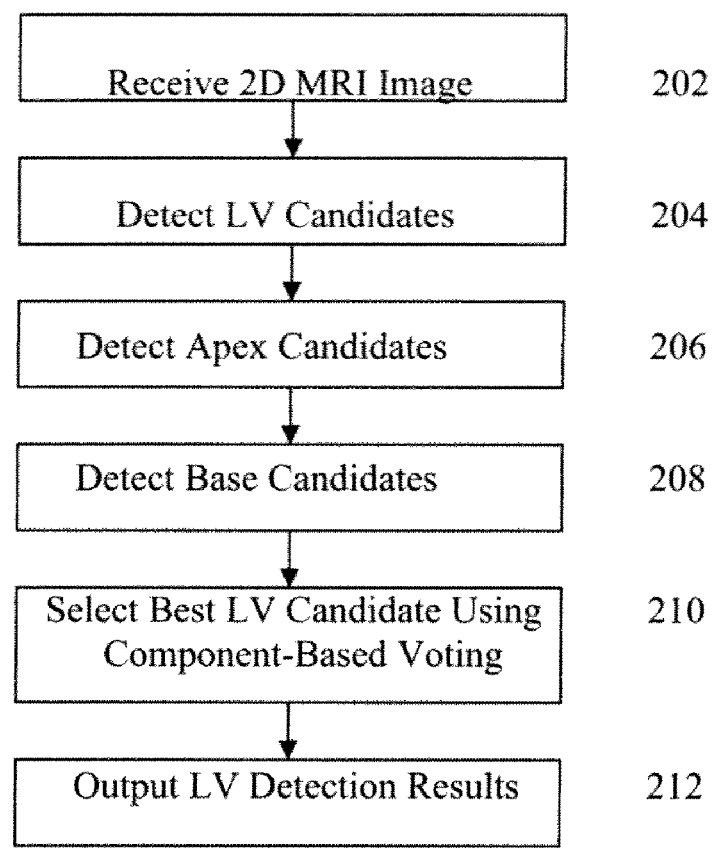
FIG. 2 illustrates a method for LV detection in a 2D MRI image according to an embodiment of the present invention.

FIG. 2 illustrates a method for LV detection in a 2D MRI image according to an embodiment of the present invention. The method of FIG. 1 transforms MRI image data representing a patient's heart to detect or localize the location of the left ventricle in the patient's heart. At step 202, a 2D MRI image is received. The MRI image can be received from an MRI scanning device, or can be a previously stored MRI image loaded from memory or storage of a computer system, or some other computer readable medium.

At step 204, LV candidates are detected in the 2D MRI image using MSL. To localize a 2D object, such as the LV in a 2D MRI image, five parameters must be estimated: two for position, one for orientation, and two for anisotropic scaling. These parameters can be visually represented as a box tightly enclosing the LV. The box center is defined as the center of the line connecting the LV apex and the LV basal center. The LV basal center is defined herein as the middle position between two annulus points. The box length along the LV axis can be defined as 1.5 times the distance between the apex and the basal center. The box length in the opposite direction is defined as 2.4 times the distance between the two annulus points. From a detected LV box, the anatomic landmarks of the LV apex, the LV basal center, and the two annulus points can be determined.

In order to detect LV candidates using MSL, a detector is trained for each MSL step (see FIG. 1) based on annotated training data. In the first stage of MSL, the position of the object (LV) is estimated in the image using a trained position detector. For the position estimation, orientation and scales are treated as intra-class variations, therefore learning is constrained in a marginal space with two dimensions. According to an advantageous implementation, the position detector can be trained based on the training data using Haar wavelet features. Given a set of candidate pixels in the training data, the candidates are split into two groups, positive and negative, based on their distance to the ground truth. For example, in an advantageous implementation, a positive sample (X, Y) should satisfy:

$$\max\{|X-X_t|,|Y-Y_t|\}\leq 2 \text{ mm}, \quad (1)$$

and a negative sample should satisfy:

$$\max\{|X-X_t|,|Y-Y_t|\}>6 \text{ mm}. \quad (2)$$

Here, $(X_t,Y_t)$ is the ground truth of the object (LV) center. The searching step for position estimation can be 1 pixel. All positive samples in the training data satisfying Equation (1) are collected for training. Since the total number of negative samples from a training set is typically very large, a limited number of negatives are used for training. For example, approximately three million negatives can be randomly sampled from the whole training set.

Given a set of positive and negative training samples, 2D Haar wavelet features can be extracted from the training images for the samples. A classifier (detector) is then trained based on these features using a probabilistic boosting tree (PBT). The PBT boosts the performance of weak classifiers to generate a strong tree-structure classifier. The trained position detector is used to scan a training image a preserve a small number of top LV position candidates. The number of preserved candidates can be tuned based on the performance of the trained classifier and the target detection speed of the system. According to an advantageous implementation, 1000 candidates can be preserved in order to ensure that most training images have at least one true positive among the candidates.

After the position detector is trained, the position-orientation detector is then trained. Suppose for a given training image, 1000 candidates $(X_i,Y_i)$, i=1, . . . ,1000 are preserved for the LV position. A detector is then trained to estimate both the position and orientation. The parameter space for this stage is three dimensional (2D for position and 1D for orientation), so the dimension of the candidates must be augmented. For each position candidate, the orientation space is sampled uniformly to generate hypotheses for position-orientation estimation. The orientation search step can be set to be five degrees, corresponding to 72 hypotheses for the orientation subspace for each position candidate. Among all of these hypotheses some are close to the ground truth (positive) and some are far away (negative). The learning goal is to distinguish the positive and negative samples using image features. In an advantageous implementation, a hypothesis $(X,Y,\theta)$ is regarded as a positive sample if it satisfies both Equation (1) and:

$$|\theta-\theta_t|\leq 5 \text{ degrees}, \quad (3)$$

and a negative sample satisfies either Equation (2) or:

$$|\theta-\theta_t|>10 \text{ degrees}, \quad (4)$$

where θ, represents the ground truth of the LV orientation. Similarly to training the position detector, a number of negative samples (e.g., three million) can be randomly sampled over the training set.

Since aligning Haar wavelet features to a specific orientation is not efficient, steerable features can be used for training the position-orientation detector in order to avoid image rotation. A PBT is used to train a classifier (detector) based on the steerable features. The trained position-orientation detector is used to prune the hypotheses to preserve only a few candidates (e.g., 100) for object position and orientation.

Once the position-orientation detector is trained, the position-orientation-scale detector is trained to estimate the full parameter of the LV box. The training of the detector for full parameter estimation is analogous to training the position-orientation detector, except learning is performed in the full five-dimensional similarity transformation space. The dimension of each position-orientation candidate is augmented by scanning the scale subspace uniformly and exhaustively For example, in an advantageous implementation, the ranges of $S_x$ and $S_y$, of the LV can be [62.9, 186.5] mm and [24.0, 137.81] mm, respectively, and the search step for the scales can be set to 6 mm. In this case, to cover the whole range, 22 uniformly distributed samples are generated for $S_x$ and 20 are generated for $S_y$. In total, there are 440 hypotheses for the scale subspace for each position-orientation candidate.

In an advantageous implementation, a hypothesis (X,Y,θ, $S_x,S_y$) is regarded as positive if it satisfies, Equations (1), (3), and:

$$\max\{|S_x-S_x^t|, |S_y-S_y^t|\} \leq 6 \text{ mm}, \quad (5)$$

and a negative sample satisfies any one condition of Equations (2), (4), or:

$$\max\{|S_x-S_x^t|, |S_y-S_y^t|\} > 12 \text{ mm}, \quad (6)$$

where $S_x^t$ and $S_y^t$ represent the ground truth of the LV scales. A number of negative samples (e.g., three million) can be randomly sampled over the training set, and a PBT-based classifier can be trained using steerable features.

In order to detect the LV candidates in the received 2D MRI image in step 204, the image is first normalized. For example, the image can be normalized to a 1 mm resolution. All of the pixels of the normalized image are then tested using the trained position detector in order to detect the pixels with the highest probability of being the center of the LV. A predetermined number of position candidates detected by the position detector with the highest probability are kept. For example, the top 1000 position candidates, $(X_i,Y_i)$, i=1, . . . ,1000, can be kept. Each position candidate is augmented with a plurality of orientations to generate position-orientation hypotheses. For example, each position candidate can be augmented with 72 orientation hypotheses $(X_i,Y_i,θ_j)$, j=1, . . . ,72 to generate 1000×72=72,000 position-orientation hypotheses. The position-orientation hypotheses are tested using the trained position-orientation detector to detect the top position-orientation candidates. For example, the top 100 position-orientation candidates detected by the position-orientation detector can be retained, $(\hat{X}_i,\hat{Y}_i,\hat{θ}_i)$, i=1, . . . ,100. Each position-orientation candidate is augmented with a plurality of scales to generate position-orientation-scale hypotheses. For example, each position-orientation candidate can be augmented with 440 scale hypotheses to generate 100×440=44,000 position-orientation-scale hypotheses. The position-orientation-scale hypotheses are then tested using the trained position-orientation-scale detector to detect the top LV box candidates. This results in a predetermined number of LV candidates. For example, the top 100 LV candidates detected by the position-orientation-scale detector with the highest probability can be retained.

Figure 3:
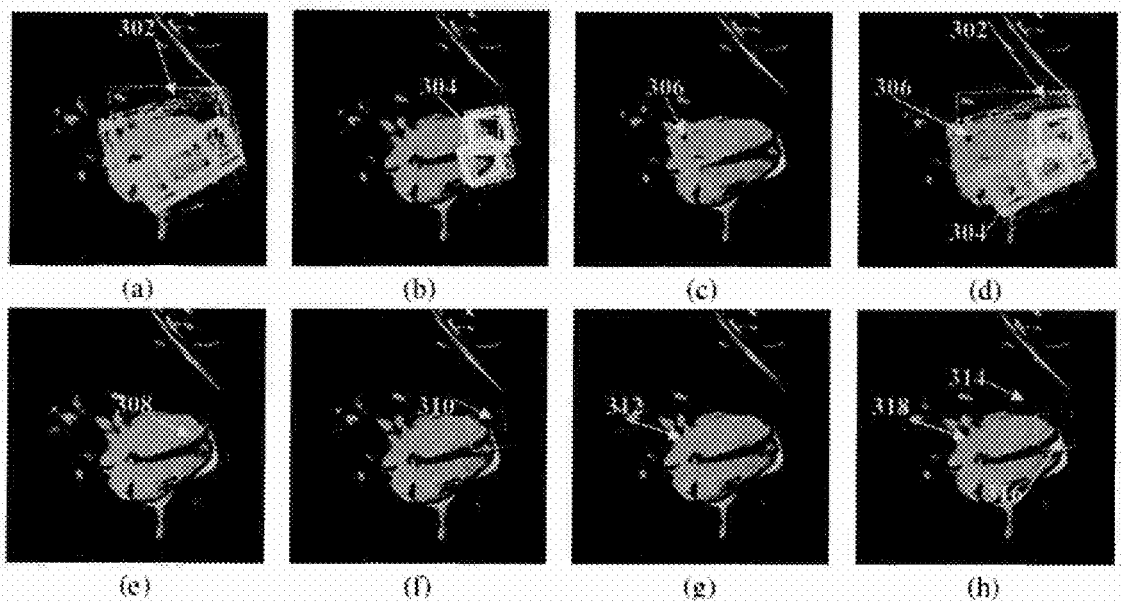
FIG. 3 illustrates LV and anatomical landmark detection results in exemplary 2D MRI images.

FIG. 3 illustrates LV and anatomical landmark detection results in exemplary 2D MRI images. As illustrated in FIG. 3, image (a) shows LV candidates 302 detected using MSL in an A4C canonical view 2D MRI image. The LV and RV are similar in both shape and appearance in this view. Previous MSL applications for 3D object detection aggregate the top candidates resulting from the position-orientation-scale detector using clustering analysis to generate the final detection result. Image (e) of FIG. 3 shows the LV detection result 308 resulting from aggregating the candidates 302 shown in image (a). Since more of the candidates 302 are distributed around the RV, the wrong object is selected as the final aggregated detection result 308. Thus, according to an embodiment of the present invention, the LV candidates resulting from the position-orientation-scale detector are combined with other distinctive anatomic landmarks associated with the LV in order achieve more robust LV detection results.

Returning to FIG. 2, at step 206, apex candidates are detected in the received 2D MRI image. For example, similar to the detection of the whole LV candidates described above, MSL can be used to detect candidates for the LV apex, which is a well-known anatomical landmark. Each apex candidate can be visually represented as a box surrounding the LV apex. Although the apex is just a point, it is detected as a region by defining an oriented box around the apex. In this way, the orientation and size information of the surrounding region can be exploited to distinguish the apex from other confusing points. According to an advantageous implementation, the top 100 apex candidates resulting from the apex detection can be retained. Image (b) of FIG. 3 shows apex candidates 304 detected in an exemplary 2D MRI image. Image (f) of FIG. 3 shows the final detection result 310 of the apex generated by aggregating the apex candidates 304 of image (b).

Returning to FIG. 2, at step 208, base candidates are detected in the received 2D MRI image. Each base candidate can be visually represented as a box centered at the basal center (the mitral valve center) and tightly enclosing the annulus points of the mitral valve. The base candidates can be detected using MSL, similar to the detection of the whole LV candidates and the apex candidates described above. According to an advantageous embodiment of the present invention, the top 100 base candidates resulting from the base detection can be retained. In this step (as in the apex detection and the LV detection), selection of the top candidates is based on the detection score. The PBT classifier will assign a high score to a good candidate (closing to the true position) and a low score to a bad candidate (far away from the true position). Image (c) of FIG. 3 shows base candidates 306 detected in an exemplary 2D MRI image. Image (g) shows the final detection result 312 of the base box generated by aggregating the base candidates 306 of image (c).

Returning to FIG. 2, at step 210, the best LV candidate is selected using component-based voting based on the LV candidates, the apex candidates, and the base candidates. This step combines the detection results of the whole LV with the detection results of the distinctive landmarks of the apex and the base in order to achieve more robust detection results for the LV and for the anatomical landmarks. As described above, each of the detection steps (204, 206, and 208) output a set of candidates, and each candidate is a five-dimensional vector. According to an embodiment of the present invention, a voting scheme is used to combine the LV candidates, apex candidates, and base candidates by considering the geometric relationship between the LV and the anatomic landmarks associated with the LV. Image (d) of FIG. 3 shows the LV candidates 302, apex candidates 304, and base candidates 306 detected for an exemplary 2D MRI image. Image (h) shows the final detection result for the LV 314, apex 316, and base 318 generated using component-based voting according to an embodiment of the present invention.

Figure 4A:
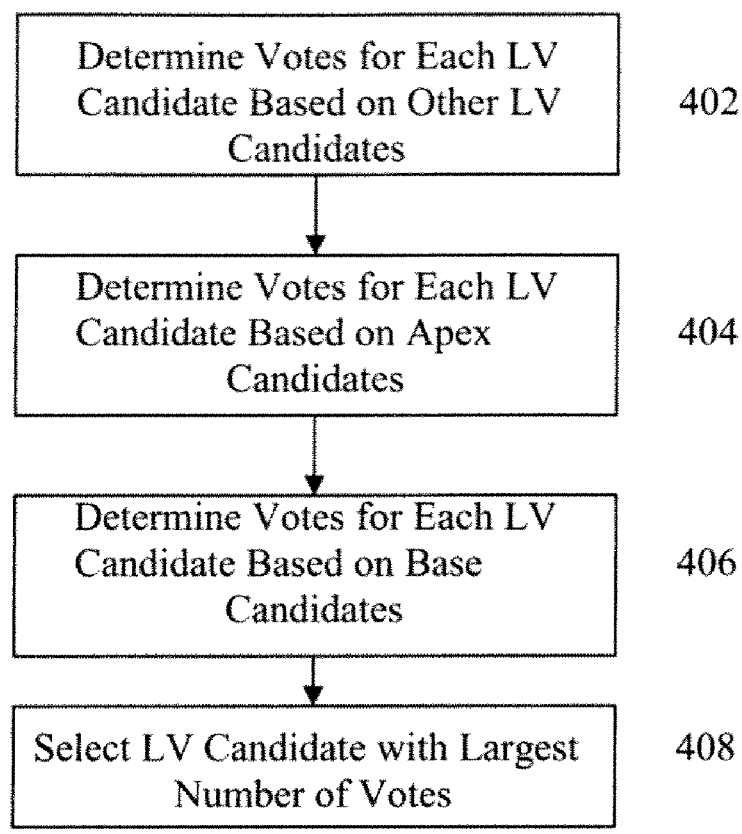
FIG. 4A illustrates a method for selecting an LV candidate using component-based voting according to an embodiment of the present invention.

FIG. 4A illustrates a method for selecting an LV candidate using component-based voting according to an embodiment of the present invention. The method of FIG. 4A can be used to implement step 210 of FIG. 2. FIG. 4B illustrates pseudocode for implementing the method of FIG. 4A. The method of FIGS. 4A and 4B selects an LV candidate by aggregating votes for each LV candidate from three sources: the other LV candidates, the apex candidates, and the base candidates.

Figure 5:
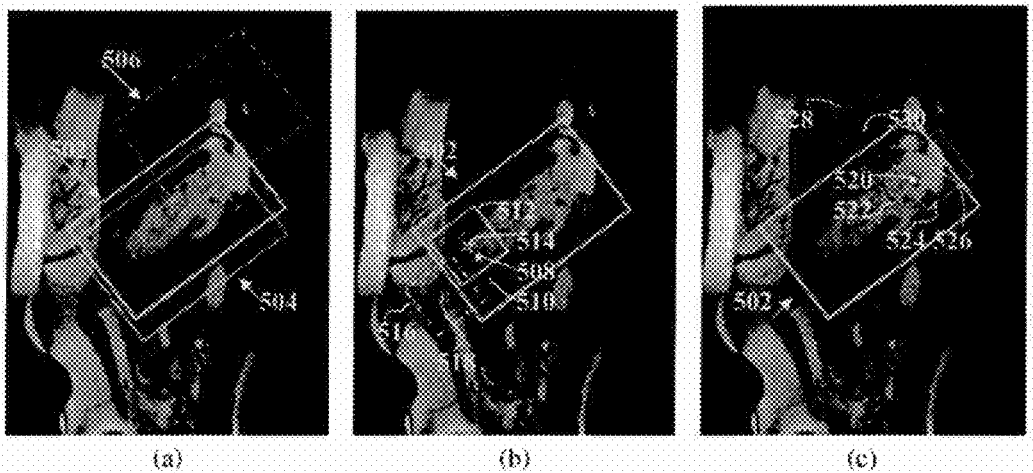
FIG. 5 illustrates the component-based voting method of FIGS. 4A and 4B in an exemplary 2D MRI image.

Referring to FIG. 4A, at step 402, votes are determined for each LV candidate based on the other LV candidates. A detector tends to fire up around the true position multiple times, while fire-ups at a wrong position are sporadic. Accordingly, an LV candidate receives a vote for each other LV candidate that is close to it. This step is illustrated at 452 of FIG. 4B. As illustrated at 452 of FIG. 4B, for each LV candidate, the box to box distance is calculated from that LV candidate to each other LV candidate and a vote is tallied for each other LV candidate within a particular threshold (e.g., 20 mm). FIG. 5 illustrates the component-based voting method of FIGS. 4A and 4B in an exemplary 2D MRI image. As illustrated in image (a) of FIG. 5, for LV candidate 502, LV candidate 504 is close to LV candidate 502, therefore LV candidate 502 receives a vote from LV candidate 504. LV candidate 506 is not close to LV candidate 502, therefore LV candidate 502 does not receive a vote from LV candidate 506.

Returning to FIG. 4A, at step 404, votes are determined for each LV candidate based on the apex candidates. This step is illustrated at 454 of FIG. 4B. In order to determine votes for a particular LV candidate based on the apex candidates, the position of the apex is first predicted for that LV candidate. As defined herein, the center of the LV box is defined as the center line connecting the apex and the base. The length of the box along the long LV axis is defined as the center of the line connecting the apex and the base. Therefore it is straightforward to determine a predicted position for the apex and the base for each LV candidate. Accordingly, for each LV candidate a predicted position of the apex is calculated and the LV candidate receives a vote for each apex candidate having a center within a certain distance (e.g., 10 mm) of the predicted position of the apex for that LV candidate. As illustrated in image (b) of FIG. 5, for LV candidate 502, a predicted apex position 508 is determined and a tolerance region 510 (e.g., 10 mm) is established around the predicted apex position 508. Apex candidate 512 has a center 514 within the tolerance region 510, therefore LV candidate 502 receives a vote for apex candidate 512. Apex candidate 516 has a center 518 that is not within the tolerance region 510, therefore LV candidate 502 does not receive a vote from apex candidate 516.

Returning to FIG. 4A, at step 406, votes are determined for each LV candidate based on the base candidates. This step is illustrated at 456 of FIG. 4B. In order to determine votes for a particular LV candidate based on the base candidates, the position of the base is first predicted for that LV candidate. As described above, it is straightforward to determine a predicted position for the apex and the base (i.e., the basal center) for each LV candidate. Accordingly, for each LV candidate a predicted position of the basal center is calculated and the LV candidate receives a vote for each base candidate having a center within a certain distance (e.g., 10 mm) of the predicted position of the basal center for that LV candidate. As illustrated in image (c) of FIG. 5, for LV candidate 502, a predicted basal center position 520 is determined and a tolerance region 522 (e.g., 10 mm) is established around the predicted basal center position 520. Base candidate 524 has a center 526 within the tolerance region 522, therefore LV candidate 502 receives a vote for base candidate 524. Base candidate 528 has a center 530 that is not within the tolerance region 522, therefore LV candidate 502 does not receive a vote from base candidate 528.

Returning to FIG. 4A, at step 410, the LV candidate with the largest number of votes is selected as the final LV detection result. This step is illustrated as 458 in FIG. 4B. As a byproduct of the component-based detection of the LV, detection results for the apex and the base of the detected LV can be generated as well. For example, after the final LV detection result is determine, the predicted positions of the apex and the base can be determined for the final LV detection result, and the trained apex and base detectors can be run around these predicted regions to generate apex and base detection results that are consistent with the detected LV (see image (h) of FIG. 3).

As described above, in the component-based voting method for selecting a best LV candidate uses nonweighted voting (i.e., each vote for an LV candidate is weighted the same). According to an alternative embodiment of the present invention, it is also possible the weight each vote for an LV candidate, for example, based on the distance a particular component (other LV candidate, apex candidate, or base candidate) is to the corresponding component of the LV candidate.

Returning to FIG. 2, at step 212, the LV detection results are output. In addition to the detected LV, the LV detection results that are output can also include the detected apex and the detected base as well. For example, the LV detection results can be output by displaying the LV detection results on a display of a computer system, or other display device. It is also possible that the LV detection results can be output by storing the detected LV and corresponding anatomic features, for example, on a storage or memory of a computer system or on a computer readable medium. The output LV detection results can also be used for additional processing of the 2D MRI image. For example, the detected LV can be used in a method for LV quantification to measure activity of the LV.

Figure 6:
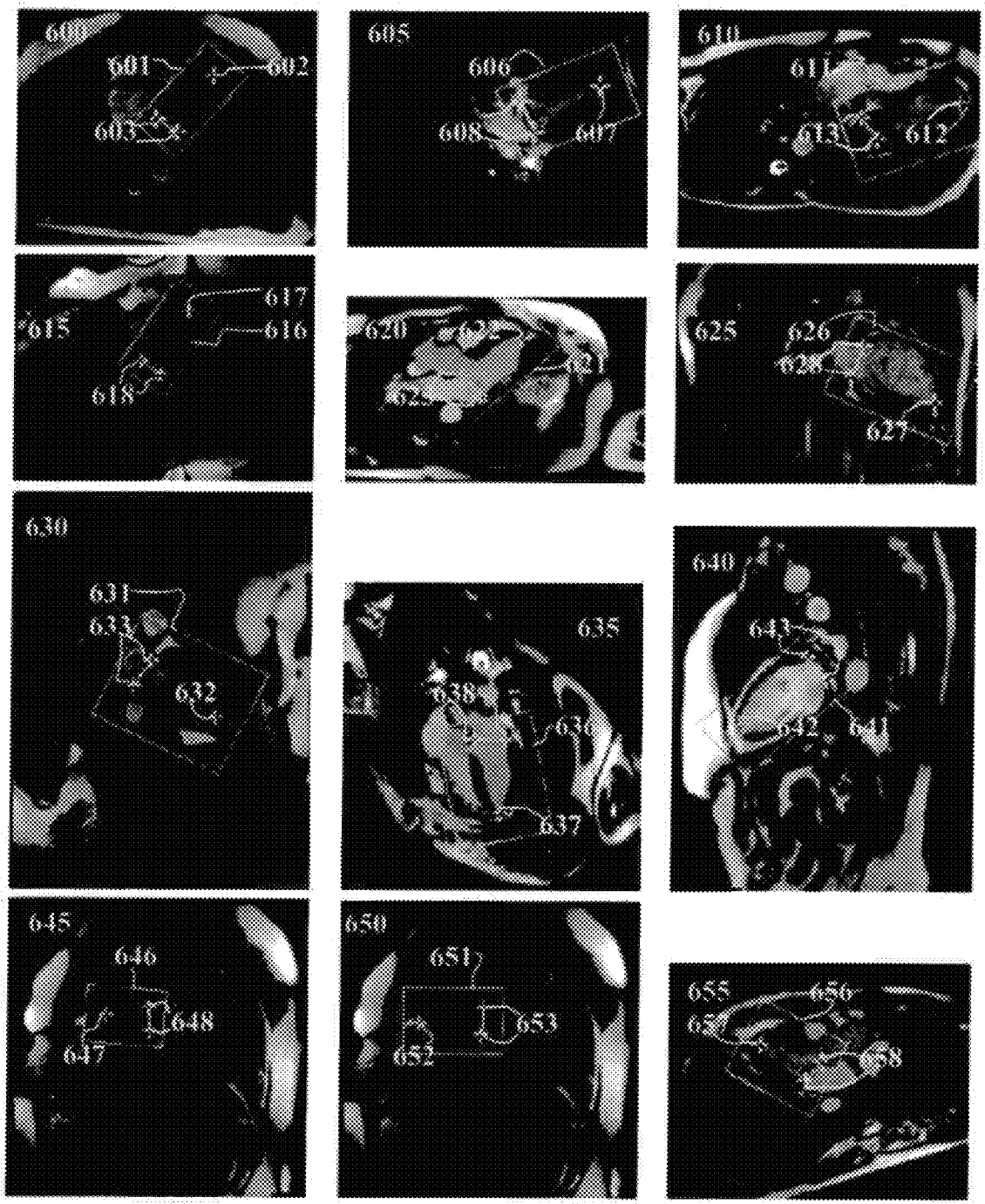
FIG. 6 illustrates exemplary LV detection results.

FIG. 6 illustrates exemplary LV detection results detected using the methods of FIGS. 1, 4A and 4B. As illustrated in FIG. 6 each of images 600, 605, 610, 615, 620, 625, 630, 635, 640, 645, 650, and 655 show detected a LV 601, 606, 611, 616, 621, 626, 631, 6363, 641, 646, 615, and 656, a detected apex 602, 607, 612, 617, 622, 627, 632, 637, 642, 647, 652, and 657, detected mitral valve annulus points 603, 608, 613, 618, 623, 628, 633, 638, 643, 648, 653, and 658, respectively. The mitral valve annulus points 603, 608, 613, 618, 623, 628, 633, 638, 643, 648, 653, and 658 are anatomic landmarks that are generated from the detected base box. It is straightforward to determine the annulus points from a base box since the box is defined in the following way. The center of the box is defined as the center of two annulus points. The box is aligned with the direction connecting two annulus points. The length of box in the direction connection the two annulus points is the distance between the annulus points. Therefore, each annulus point lies at the center of one of the box's sides.

Figure 7:
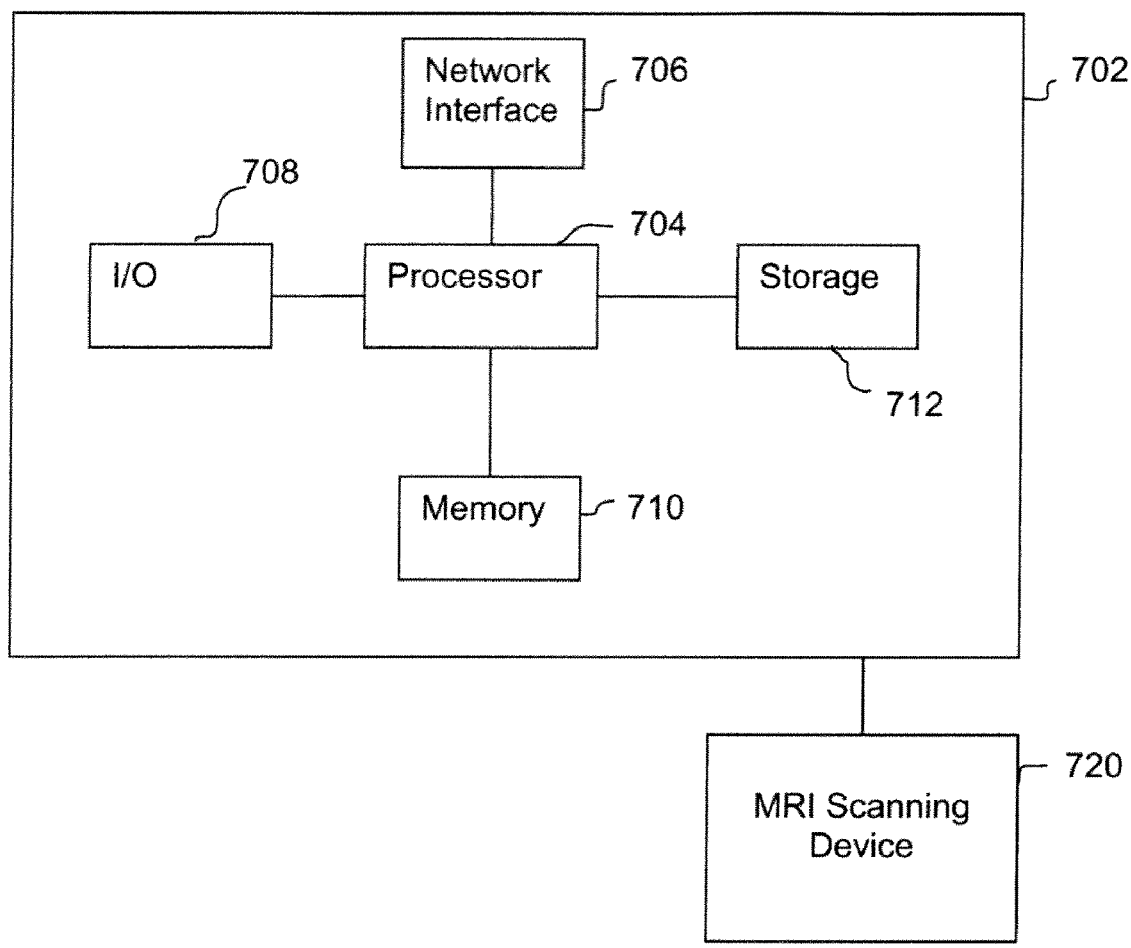
FIG. 7 is a high level block diagram of a computer capable of implementing the present invention.

The above-described methods for LV detection in an input 2D MRI image may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.) and loaded into memory 710 when execution of the computer program instructions is desired. Thus, the steps of the method of FIGS. 2, 4A, and 4B may be defined by the computer program instructions stored in the memory 710 and/or storage 712 and controlled by the processor 704 executing the computer program instructions. An MR scanning device 720 can be connected to the computer 702 to input MRI images to the computer 702. it is possible to implement the MR scanning device 720 and the computer 702 as one device. it is also possible that the MR scanning device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for left ventricle (LV) detection in a 2D magnetic resonance imaging (MRI) image, comprising:
    detecting a plurality of LV candidates in the 2D MRI image;
    detecting a plurality of apex candidates in the 2D MRI image;
    detecting a plurality of base candidates in the 2D MRI image; and
    selecting one of the plurality LV candidates using component-based voting based on each of the plurality of LV candidates, the plurality of apex candidates, and the plurality of base candidates, wherein said step of selecting one of the plurality LV candidates using component-based voting based on each of the plurality of LV candidates, the plurality of apex candidates, and the plurality of base candidates comprises:
        determining votes for each of the plurality of LV candidates based on other LV candidates of the plurality of LV candidates,
        determining votes for each of the plurality of LV candidates based on the apex candidates,
        determining votes for each of the plurality of LV candidates based on the base candidates, and
        selecting as a detection result the one of the plurality of LV candidates having a largest number of votes.

2. The method of claim 1, wherein said step of detecting a plurality of LV candidates in the 2D MRI image comprises:
    detecting the plurality of LV candidates using marginal space learning (MSL).

3. The method of claim 1, wherein said step of detecting a plurality of LV candidates in the 2D MRI image comprises:
    detecting a plurality of position candidates for the LV in the 2D MRI image using a trained position detector;
    generating a plurality of position-orientation hypotheses from each of the plurality of position candidates;
    detecting a plurality of position-orientation candidates from the plurality of position-orientation hypotheses using a trained position-orientation detector;
    generating a plurality of position-orientation-scale hypotheses from each of the plurality of position-orientation candidates; and
    detecting the plurality of LV candidates from the plurality of position-orientation-scale hypotheses using a trained position-orientation-scale detector.

4. The method of claim 3, wherein each of the position detector, the position-orientation detector, and the position-orientation-scale detector are trained using a probabilistic boosting tree (PBT).

5. The method of claim 2, wherein the plurality of apex candidates and the plurality of base candidates are detected using MSL.

6. The method of claim 1, wherein said step of determining votes for each of the plurality of LV candidates based on other LV candidates of the plurality of LV candidates comprises, for each LV candidate:
    determining a vote for the LV candidate from each of the other LV candidates located within a certain distance of the LV candidate.

7. The method of claim 1, wherein said step of determining votes for each of the plurality of LV candidates based on the apex candidates comprises, for each LV candidate:
    determining a predicted position of the apex for the LV candidate; and
    determining a vote for the LV candidate from each apex candidate having a center point within a certain distance of the predicted position of the apex for the LV candidate.

8. The method of claim 1, wherein said step of determining votes for each of the plurality of LV candidates based on the base candidates comprises, for each LV candidate:
    determining a predicted position of a basal center for the LV candidate; and
    determining a vote for the LV candidate from each base candidate having a center point within a certain distance of the predicted position of the basal center for the LV candidate.

9. The method of 1, further comprising:
    determining predicted apex and base positions in the 2D MRI image based on the selected one of the plurality of LV candidates;
    detecting the apex of the LV around the predicted apex position in the 2D MRI image; and
    detecting the base of the LV around the predicted base position in the 2D MRI image.

10. An apparatus for left ventricle (LV) detection in a 2D magnetic resonance imaging (MRI) image, comprising:
    means for detecting a plurality of LV candidates in the 2D MRI image;
    means for detecting a plurality of apex candidates in the 2D MRI image;
    means for detecting a plurality of base candidates in the 2D MRI image; and
    means for selecting one of the plurality LV candidates using component-based voting based on each of the plurality of LV candidates, the plurality of apex candidates, and the plurality of base candidates, wherein said means for selecting one of the plurality LV candidates using component-based voting on based each of the plurality of LV candidates, the plurality of apex candidates, and the plurality of base candidates comprises:
        means for determining votes for each of the plurality of LV candidates based on other LV candidates of the plurality of LV candidates,
        means for determining votes for each of the plurality of LV candidates based on the apex candidates,
        means for determining votes for each of the plurality of LV candidates based on the base candidates, and means for selecting as a detection result the one of the plurality of LV candidates having a largest number of votes.

11. The apparatus of claim 10, wherein said means for detecting a plurality of LV candidates in the 2D MRI image comprises:
  means for detecting a plurality of position candidates for the LV in the 2D MRI image using a trained position detector;
  means for generating a plurality of position-orientation hypotheses from each of the plurality of position candidates;
  means for detecting a plurality of position-orientation candidates from the plurality of position-orientation hypotheses using a trained position-orientation detector;
  means for generating a plurality of position-orientation-scale hypotheses from each of the plurality of position-orientation candidates; and
  means for detecting the plurality of LV candidates from the plurality of position-orientation-scale hypotheses using a trained position-orientation-scale detector.

12. The apparatus of claim 10, wherein the plurality of LV candidates, the plurality of apex candidates, and the plurality of base candidates are detected using MSL.

13. The apparatus of claim 10, wherein said means for determining votes for each of the plurality of LV candidates based on other LV candidates of the plurality of LV candidates comprises:
  means for determining a vote for a particular LV candidate from each of the other LV candidates located within a certain distance of the particular LV candidate.

14. The apparatus of claim 10, wherein said means for determining votes for each of the plurality of LV candidates based on the apex candidates comprises:
  means for determining a predicted position of the apex for each LV candidate; and
  means for determining a vote for a particular LV candidate from each apex candidate having a center point within a certain distance of the predicted position of the apex for the particular LV candidate.

15. The apparatus of claim 10, wherein said means for determining votes for each of the plurality of LV candidates based on the base candidates comprises:
  means for determining a predicted position of a basal center for each LV candidate; and
  means for determining a vote for a particular LV candidate from each base candidate having a center point within a certain distance of the predicted position of the basal center for the particular LV candidate.

16. A non-transitory computer readable medium encoded with computer executable instructions for left ventricle (LV) detection in a 2D magnetic resonance imaging (MRI) image, the computer executable instructions defining steps comprising:
  detecting a plurality of LV candidates in the 2D MRI image;
  detecting a plurality of apex candidates in the 2D MRI image;
  detecting a plurality of base candidates in the 2D MRI image; and
  selecting one of the plurality LV candidates using component-based voting based on each of the plurality of LV candidates, the plurality of apex candidates, and the plurality of base candidates, wherein the computer executable instructions defining the step of selecting one of the plurality LV candidates using component-based voting based on each of the plurality of LV candidates, the plurality of apex candidates, and the plurality of base candidates comprise computer executable instructions defining the steps of:
    determining votes for each of the plurality of LV candidates based on other LV candidates of the plurality of LV candidates,
    determining votes for each of the plurality of LV candidates based on the apex candidates,
    determining votes for each of the plurality of LV candidates based on the base candidates, and
  selecting as a detection result the one of the plurality of LV candidates having a largest number of votes.

17. The non-transitory computer readable medium of claim 16, wherein the plurality of LV candidates, the plurality of apex candidates, and the plurality of base candidates are detected using MSL.

18. The non-transitory computer readable medium of claim 16, wherein the computer executable instructions defining the step of detecting a plurality of LV candidates in the 2D MRI image comprise computer executable instructions defining the steps of:
  detecting a plurality of position candidates for the LV in the 2D MRI image using a trained position detector;
  generating a plurality of position-orientation hypotheses from each of the plurality of position candidates;
  detecting a plurality of position-orientation candidates from the plurality of position-orientation hypotheses using a trained position-orientation detector;
  generating a plurality of position-orientation-scale hypotheses from each of the plurality of position-orientation candidates; and
  detecting the plurality of LV candidates from the plurality of position-orientation-scale hypotheses using a trained position-orientation-scale detector.

19. The non-transitory computer readable medium of claim 16, wherein the computer executable instructions defining the step of determining votes for each of the plurality of LV candidates based on other LV candidates of the plurality of LV candidates comprise computer executable instructions defining the step of, for each LV candidate:
  determining a vote for the LV candidate from each of the other LV candidates located within a certain distance of the LV candidate.

20. The non-transitory computer readable medium of claim 16, wherein the computer executable instructions defining the step of determining votes for each of the plurality of LV candidates based on the apex candidates comprise computer executable instructions defining the steps of, for each LV candidate:
  determining a predicted position of the apex for the LV candidate; and
  determining a vote for the LV candidate from each apex candidate having a center point within a certain distance of the predicted position of the apex for the LV candidate.

21. The non-transitory computer readable medium of claim 16, wherein said the computer executable instructions defining the step of determining votes for each of the plurality of LV candidates based on the base candidates comprise computer executable instructions defining the steps of, for each LV candidate:
  determining a predicted position of a basal center for the LV candidate; and
  determining a vote for the LV candidate from each base candidate having a center point within a certain distance of the predicted position of the basal center for the LV candidate.

* * * * *